United States Patent
Carlson et al.

(10) Patent No.: US 11,404,980 B2
(45) Date of Patent: Aug. 2, 2022

(54) CONTROL LOADING WITH SLOTTED MOTOR

(71) Applicant: Tru Simulation + Training, Inc., Goose Creek, SC (US)

(72) Inventors: John Albert Carlson, Tampa, FL (US); Joseph Michael Corrao, New Port Richey, FL (US); Nicholas Matthew Duque, Wesley Chapel, FL (US); David Anthony Fontanella, Lutz, FL (US)

(73) Assignee: TRU SIMULATION + TRAINING, INC., Goose Creek, SC (US)

( * ) Notice: Subject to any disclaimer, the term of this patent is extended or adjusted under 35 U.S.C. 154(b) by 0 days.

(21) Appl. No.: 17/159,751

(22) Filed: Jan. 27, 2021

(65) Prior Publication Data

US 2021/0234483 A1    Jul. 29, 2021

Related U.S. Application Data

(60) Provisional application No. 62/966,459, filed on Jan. 27, 2020.

(51) Int. Cl.
*H02P 6/10*    (2006.01)

(52) U.S. Cl.
CPC ..................... *H02P 6/10* (2013.01)

(58) Field of Classification Search
CPC .... H02P 6/10; G09B 9/28; G09B 9/02; G09B 9/12; G09B 9/08; G09B 9/06; G09B 9/01; G09B 9/16
See application file for complete search history.

(56) References Cited

U.S. PATENT DOCUMENTS

| | | | |
|---|---|---|---|
| 3,281,962 A | 11/1966 | Pancoe | |
| 3,463,866 A | 8/1969 | Staples | |
| 3,496,651 A | 2/1970 | Briguglio et al. | |
| 5,209,661 A * | 5/1993 | Hildreth | G05G 5/03 244/223 |
| 11,132,917 B2 * | 9/2021 | Dispagne | G09B 9/28 |
| 2008/0100252 A1 * | 5/2008 | Tillotson | B64C 13/0421 318/628 |

FOREIGN PATENT DOCUMENTS

| | | | | |
|---|---|---|---|---|
| CN | 207594668 U | * | 7/2018 | |
| CN | 108639313 A | * | 10/2018 | |
| EP | 1372128 | | 12/2003 | |
| EP | 3503075 | | 6/2019 | |
| FR | 3031959 A1 | * | 7/2016 | ............. B64C 13/12 |
| GB | 2132964 | | 7/1984 | |
| WO | 200120351 | | 3/2001 | |

\* cited by examiner

*Primary Examiner* — Bickey Dhakal
(74) *Attorney, Agent, or Firm* — BainwoodHuang (57) ABSTRACT

A technique for control loading employs a slotted motor having a higher power density than comparably-powerful slotless motors. The use of smaller slotted motors enables more efficient mounting hardware, smaller gear reduction mechanisms, and more efficiently mounted force transducers. The technique overcomes cogging and smooths torque response of the slotted motor by combining high-gain servo control with high-resolution motor sensing.

20 Claims, 4 Drawing Sheets

CONTROL LOADING WITH SLOTTED MOTOR

CROSS-REFERENCE TO RELATED APPLICATIONS

This application claims the benefit of U.S. Provisional Patent Application No. 62/966,459, filed Jan. 27, 2020, the contents and teachings of which are hereby incorporated herein.

BACKGROUND

In today's aviation industry, most pilots receive a great deal of flight training in flight simulators. For this training to be effective, flight simulators must be able to accurately replicate the static and dynamic "feel" of cockpit flight controls under normal and abnormal conditions.

The portion in a flight simulator responsible for replicating this feel is commonly referred to as a "control loading system." This system generally consists of a force-generating device, known as a control loader, a servo drive, and a model of the aircraft flight control system which simulates the aircraft "feel" forces.

Control loaders are typically electro-mechanical devices containing an electric motor and, if the motor is brushless, a commutation transducer. Servo drives are a special type of electronic amplifier formed from a combination of electrical hardware, firmware and/or software. Aircraft models define the specific behavior of each flight control system and, most often, are generated in a separate control loading computer.

The control loader and servo drive work in concert to establish performance and fidelity capabilities of a given control loading system. Consequently, the design and integration of these items sharply distinguish one system from another and determine which systems are appropriate for specified FAA simulation certification levels—the highest being Federal Regulation 14 CFR Part 60, Level D, or equivalent.

SUMMARY

Unfortunately, current high-fidelity control loaders tend to be large, heavy, and expensive, making them difficult to use in many applications. The size and weight of prior control loaders have been primarily driven by motor requirements. For example, in order to generate the required force levels, dynamic fidelity, and stable, smooth (level D) performance, prior control loaders have employed large and expensive slotless motors. Such slotless motors tend to provide very smooth responses and low cogging, i.e., non-linear torque ripple, which can impair loader fidelity and feel. To accommodate the large motors, prior control loaders have also employed large and expensive motor mounting hardware, large and heavy motor/gear reduction methods, and cumbersome externally mounted force transducers.

In contrast with prior designs, an improved technique for control loading employs a slotted motor having a higher power density than slotless motors of similar power. The use of smaller slotted motors enables more efficient mounting hardware, smaller gear reduction mechanisms, and more efficiently mounted force transducers. Although slotted motors generally produce more cogging than slotless motors, the improved technique overcomes cogging and smooths the torque response by combining high-gain servo control with high-resolution motor sensing. Slotted motors are thus enabled to perform at a level previously achieved only with slotless motors, but with dramatic reductions in size, weight, and cost.

Given the smaller footprint and lower cost, the improved loader may also be practical in lower-cost simulators and as secondary controls in higher-cost simulators, applications where high fidelity has heretofore been difficult to achieve due to size and cost.

Certain embodiments are directed to a control loading system that includes a slotted motor having a motor shaft and an encoder configured to measure an angle of the motor shaft, an output arm coupled to the motor shaft and including a force transducer configured to measure an applied force applied by an operator, and a control stage. The control stage is configured to: receive inputs for (i) the applied force, (ii) the angle of the motor shaft, and (iii) a modeled force generated by a flight-control model; produce a command velocity based on a difference between the applied force and the model force; and generate, based on the inputs and on the command velocity, an output drive coupled to the slotted motor for driving the slotted motor.

In some examples, the control stage is further configured to apply a motor pole map to generate a cogging-correction based at least in part on (i) the angle of the motor shaft and (ii) the command velocity. According to some examples, the motor pole map includes an adaptive lookup table.

In some examples, the control stage is further configured to differentiate the angle of the slotted motor to generate a measure of angular velocity of the slotted motor, and generation of the output drive is further based at least in part on the measure of angular velocity of the slotted motor.

In some examples, the control stage includes multiple weighted differentiator elements configured to operate over respective time intervals, and the measure of angular velocity of the slotted motor is based at least in part on a sum of outputs of the weighted differentiator elements. According to some examples, weights of the weighted differentiator elements are established to optimize suppression of quantization noise introduced by the encoder.

According to some examples, the control stage is further configured to: generate a measure of command position as an integration of the command velocity; generate an error between the measure of command position and the angle of the motor shaft; and differentiate the error to produce a differentiated error, where the output drive is further based on the differentiated error.

In some examples, the control stage configured to differentiate the error includes multiple weighted differentiator elements configured to operate over respective time intervals, wherein the differentiated error is based at least in part of a sum of outputs of the weighted differentiator elements. According to some examples, weights of the weighted differentiator elements are configured to suppress quantization noise introduced by the encoder.

Other embodiments are directed to a method of control loading. Still other embodiments are directed to a computer program product. The computer program product stores instructions which, when executed on control circuitry of a computerized apparatus, cause the computerized apparatus to perform a method of control loading.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique for control loading employs a slotted motor having a higher power density than slotless motors of similar power. The use of smaller slotted motors enables more efficient mounting hardware, smaller gear reduction mechanisms, and more efficiently mounted force transducers.

A major challenge associated with slotted motors is meeting smoothness requirements, as slotted motors induce cogging torque which affects "feel" when rotated slowly, thus making the control loader haptics unacceptable. Additionally, present-day servo drives are unable to fully eliminate motor cogging.

In certain examples disclosed, these challenges are overcome by an advanced control stage that works in conjunction with standard off-the-self servo drives and high resolution commutation transducers. These improvements fully eliminate motor cogging and make the use of slotted motor technology feasible.

In certain examples, size and weight of the control loader are significantly reduced. Rather than using a standard motor that mounts onto the loader, which is the common approach, the motor and loader are instead merged together using frameless motor technology (See FIGS. 1 and 2). For example, the motor windings and rotor may be purchased or otherwise obtained without a motor shaft, housing, bearings, commutation device, wiring, etc. These items, plus the windings and rotor, are then designed into, and form an integral part of, the loader itself.

Reducing size further, the required motor commutation transducer is precision mounted to the motor shaft centerline inside the motor rotor, rather than mounted outside the motor. The motor rotor is then integrated into a two stage cable gear reduction system using a common shaft for both the motor and the gear reduction system input. The cable reduction system eliminates lost motion between the input and output stages and provides smooth, low friction, low inertia loader operation.

The entire gear reduction system is miniaturized, and the required force transducer is uniquely integrated into the output arm of the gear reduction system, thus significantly reducing the loader's footprint and eliminating the need for a cumbersome externally mounted force transducer. The net result is the desired small, powerful, lightweight 14 CFR Part 60, Level D capable control loading/loader system.

In some examples, position transducers are used on both the input and output stages of the gear reduction system. This feature provides real-time monitoring of the steel cables in the gear reduction system and notifies the user when maintenance is required.

A significant enabler for making the loader small and powerful is the use of slotted motor technology, a technology made possible through development of the advanced, high-gain control stage as disclosed herein. The control stage is custom engineered to remove motor cogging via precise signal mixing and custom high-order filtering.

Figure 1:
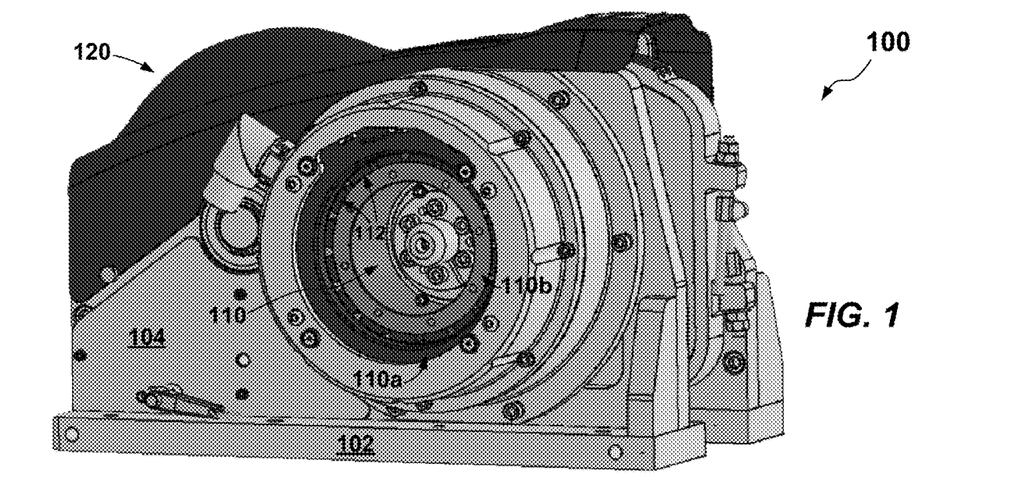
FIG. 1 is a front perspective view of an example control loader in accordance with certain embodiments.
Figure 2:
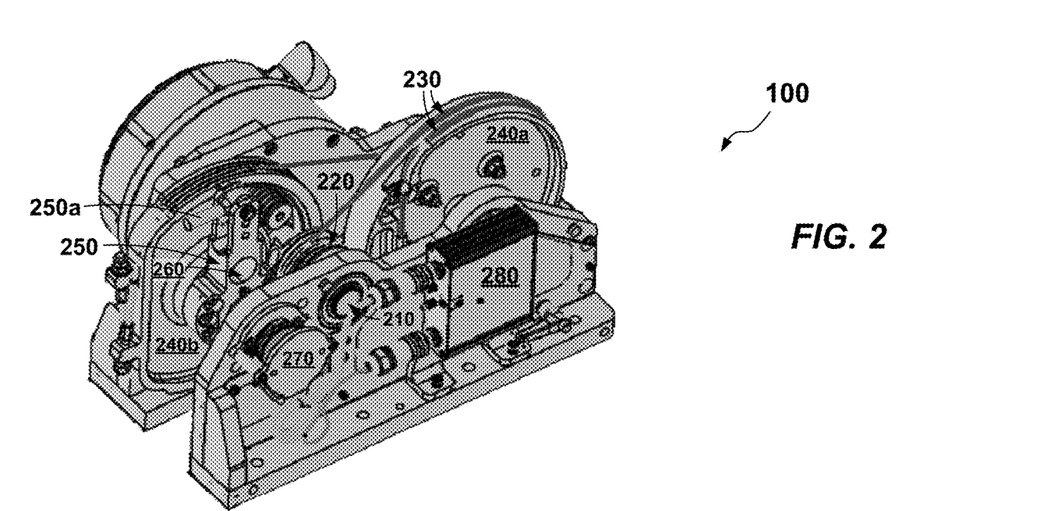
FIG. 2 is a rear perspective view of the example control loader of FIG. 1 (with cover removed).

FIGS. 1 and 2 show front and back views of an example control loader 100, respectively. As best seen in FIG. 1, the control loader 100 has a base 102, a body 104, and a cover 120. A slotted motor 110 is oriented front-to-back and includes a stator 110a and a rotor 110b. In an example, the motor 110 is provided as a brushless AC synchronous motor. The stator 110a is stationary relative to the body 104 and includes coils (not shown) which, when excited by an alternating (AC) source, are capable of inducing a rotating magnetic field. In contrast, the rotor 110b is free to rotate within the stator 110a and includes an array magnets 112. In an example, the rotor includes 16 evenly-spaced magnets 112, thus making the slotted motor 110 a 16-pole motor.

FIG. 2 shows a rear view of the same control loader 100, with the cover 120 removed. Here, a shaft 210 of the slotted motor 110 can be seen. The shaft 210 may be directly coupled to or integral with the rotor 110b. In addition, a gear-reduction input stage 220 may be coupled to or integral with the shaft 210. A cable 230 couples the input stage 220 to an output arm 250 via a gear reduction system, which includes first and second reducers 240a and 240b, respectively. The output arm 250 may include a coupling 250a to a control element, such as a lever, wheel, stick, or the like, which may be operated by a human user, e.g., a person using a flight simulator. In an example, an overall gear reduction of approximately 12:1 may be achieved, such that only two full rotations of the rotor 110b are needed to move the output arm 250 through its entire range of motion.

The output arm 250 is configured to respond to a driving force from the slotted motor 110, e.g., via the cable 230 and reducers 240a and 240b, enabling the output arm 250 to move forward and back. The output arm 250 is further configured to respond to an applied force from the user, e.g., based on the user pushing or pulling the control element coupled to the output arm 250. To this end, the control loader 100 may further include a force transducer 260, integrated into the output arm 250, such as a load cell, for measuring forces applied by the user. In some examples, an output arm position transducer 270 is coupled to the output arm 250, e.g., for measuring angular deflection of the output arm 250. The output arm transducer 270 may be provided as an optical encoder.

In some examples, the force transducer 260 is coupled to a multifunction assembly 280, e.g., via a shielded cable. The multifunction assembly 280 may include a low-noise amplifier configured to amplify the signal produced by the force transducer 260.

Figure 3A:
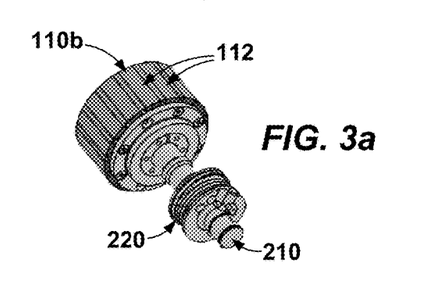
FIGS. 3a and 3b are perspective views of an example rotor assembly used in the example control loader of FIGS. 1 and 2.
Figure 3B:
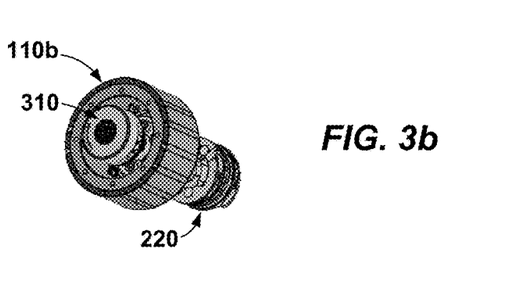

Turning now to FIGS. 3a and 3b, two perspective views of rotor 110b and associated hardware are shown. Here, magnets 112 are arranged around a circumference of the rotor 110b. Motor shaft 210 and gear reduction input stage 220 are fixedly attached to the rotor 110b. In some examples, the motor shaft 210 and input stage 220 are formed as a single machined part. As shown in FIG. 3B, a commutation transducer 310 is precision mounted to a center line of the motor shaft 210. In an example, the commutation transducer 310 includes a high-resolution optical encoder having at least 16 bits of resolution. As will be described further, the use of the high-resolution encoder enables the control loader 100 to operate as part of a control loading system 400 (FIG. 4) at high open-loop gain, improving precision and thus the highly-desired "feel" that users demand. In an example, outputs of transducers 270 and 310 are monitored in real-time to ensure proper operation of the gear reduction system and to signal the operator when maintenance is required.

Figure 4:
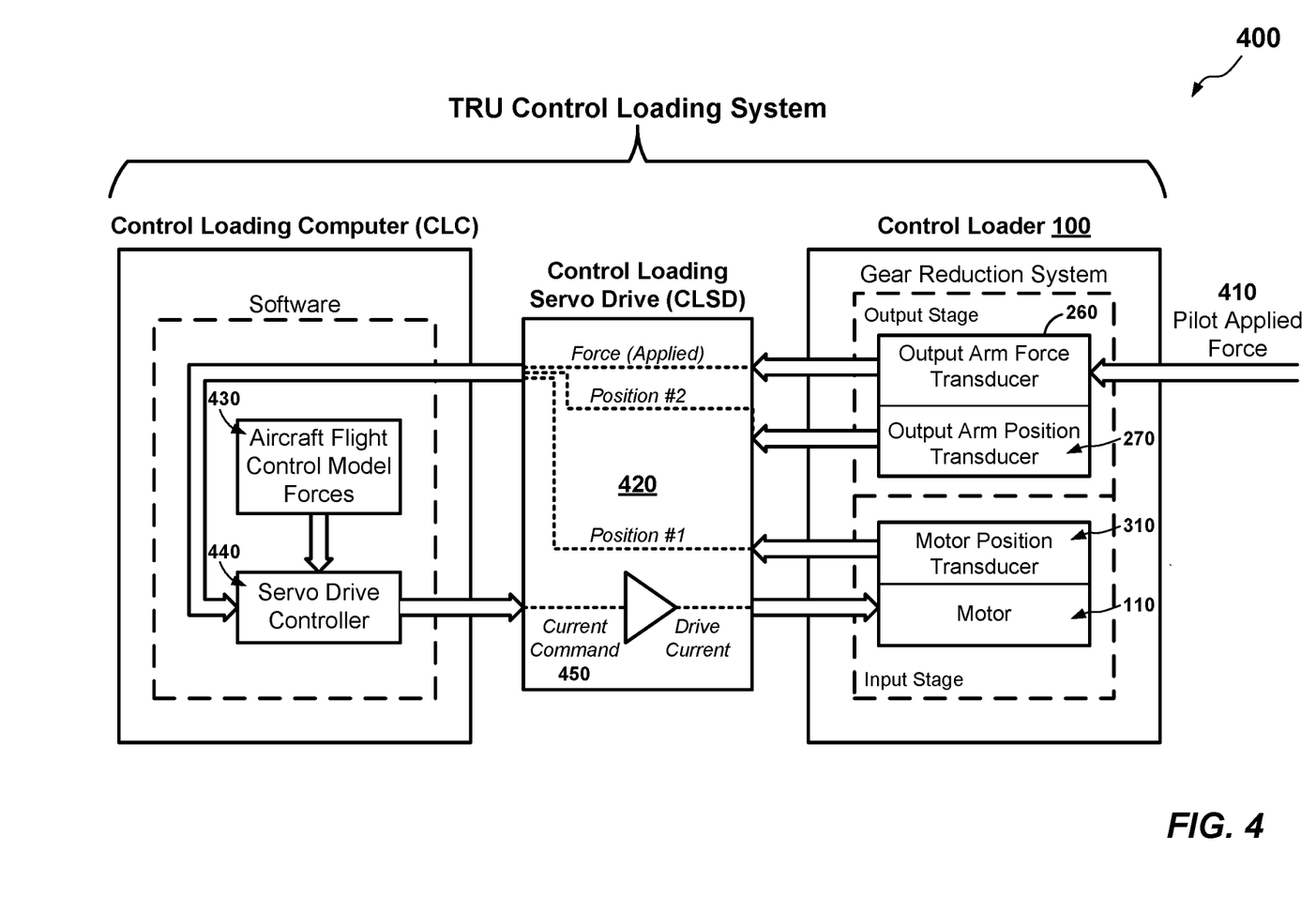
FIG. 4 is a block diagram showing an overall control loop for operating the example control loader of FIGS. 1 and 2.

FIG. 4 shows an example control loading system 400 having a control loop in which the control loader 100 may operate. Here, the output arm force transducer 260 receives an applied force 410 from a user, such as a pilot. As shown, output arm force transducer 260, output arm position transducer 270, and motor position transducer 310 provide their respective outputs to a control loading servo drive (CLSD) 420, which passes these signals, e.g., via EtherCAT, to servo drive controller 440, also referred to herein as a "control stage." Servo drive controller 440 also receives aircraft flight control model forces 430 as input. These forces 430 are based on a model of the aircraft being simulated and may take account, for example, of wind effects, friction, springs, dampers, and any other relevant aspects of the aircraft being modeled.

The servo drive controller 440 synthesizes the various inputs and generates therefrom a control signal 450 (e.g., "Current Command"), which may be provided back to the CLSD 420. CLSD 420 may then convert current command 450 to a power-level, pulse-width modulated AC signal for driving the motor 110. The motor 110 may respond by rotating forward or back, based on the applied signal. Changes in motor rotation are then reflected in the motor position transducer 310 and in the output arm transducer 270. In some examples, they may also result in changes in applied force 410, as any change in force produced by the output arm 250 may be met with an opposing force from the user. Closed-loop operation thus proceeds accordingly. Such feedback imparts a smooth, resistive feel to the pilot's force input.

Although FIG. 4 shows a separate control loading computer (CLC), the functions of the CLC may alternatively be provided in the CLSD 420. In either case, the CLC or CLSD may include a set of processors and memory (not shown). The set of processors and the memory together form control circuitry, which is constructed and arranged to carry out various methods and functions as described herein. Also, the memory includes a variety of software constructs realized in the form of executable instructions. When the executable instructions are run by the set of processors, the set of processors is made to carry out the operations of the software constructs.

Figure 5:
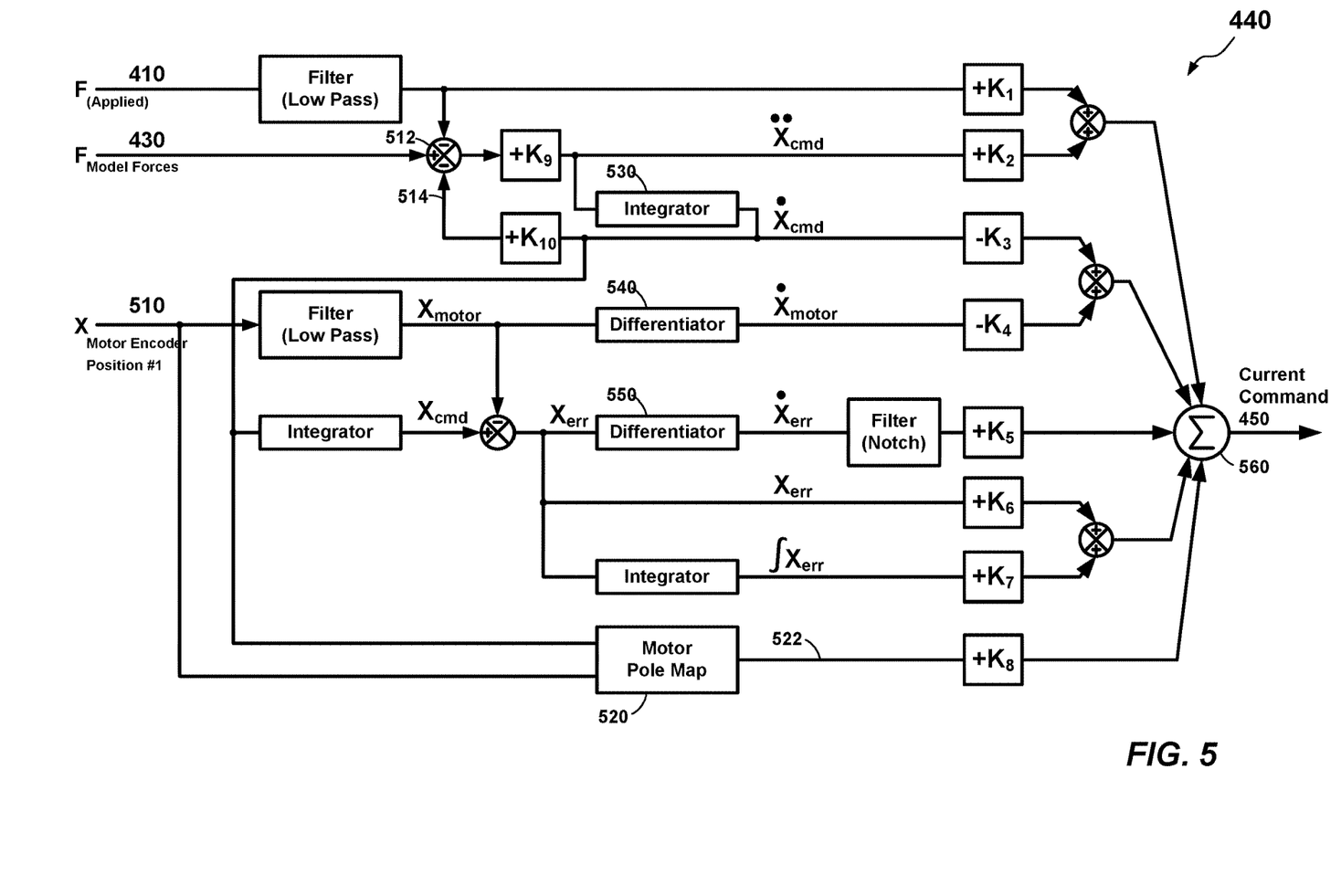
FIG. 5 is a block diagram of an example control stage that may be used in the overall control loop of FIG. 4.

FIG. 5 shows example operational details of the servo drive controller 440. As shown, the servo drive controller 440 implements a digital control stage, which performs digital signal processing on specified inputs to generate specified outputs. The control stage may operate in successive frames, where values are computed once per frame, based at least in part on the state of control variables from previous frames. Frames may be generated at a regular frequency, with 4000 frames per second being particularly suitable. Although a digital implementation of the control stage is shown, one should appreciate that an analog implementation may alternatively be used, as may a mixed implementation involving both digital and analog components.

As shown, the servo drive controller 440 (control stage) receives input in the form of applied force 410 (i.e., from the user), model forces 430 (based on the aircraft model), and an encoder position 510 received from commutation transducer 310. The servo drive controller 440 processes these inputs to generate the current command signal 450, also referred to herein as the "output drive." Multiple paths contribute to producing the current command signal 450, with contributions from the various paths added together by summer 560.

Readers familiar with feedback control theory will readily understand the depicted topology. Several aspects of the design may be particularly noted, however. For example, summer 512 subtracts both applied force 410 (or a low-pass filtered version thereof) and a local feedback force 514 from model forces 430 to produce a signal at the output of summer 512, which when multiplied by constant $K_9$ produces a signal $\ddot{X}_{cmd}$, which is proportional to acceleration. Integrator 530 integrates this acceleration term to produce a command velocity, $\dot{X}_{cmd}$, i.e., a desired velocity of the output arm 250 during the next frame. The command velocity $\dot{X}_{cmd}$ contributes to current command 450 (via $-K_3$). It also feeds back via $K_{10}$ to provide local feedback signal 514, which goes back to the summer 512. The command velocity $\dot{X}_{cmd}$ further provides a first input to motor pole map 520, which receives a second input from motor encoder position 510.

Motor pole map 520 is configured to produce an anti-cogging signal 522, i.e., a signal that compensates for effects of cogging in the slotted motor 110 by precisely balancing out those effects. As shown, anti-cogging signal 522 is based at least in part on both inputs, i.e., on both the command velocity $\dot{X}_{cmd}$ and the motor encoder position 510. For example, we have recognized that certain phase lags and other effects arise from velocity and that encoder position 510 alone is insufficient to oppose cogging precisely. In an example, motor pole map 520 is implemented as a two-dimensional lookup table. In a particular example, motor pole map 520 is realized with an adaptive lookup table. Values entered into the motor pole map 520 may be obtained by actual measurements and characterization of the motor 110. In some examples, different values are entered for different motors 110. Thus, the values in the motor pole map 520 may be specific to the particular motor used.

Also of note, servo drive controller 440 includes differentiators 540 and 550. Differentiator 540 receives angular position of the motor, $X_{motor}$, and generates an output $\dot{X}_{motor}$, which represents the angular velocity of the motor 110. Owing to the quantized nature of encoder position 510 (e.g., the quantized output of an optical encoder), angular position $X_{motor}$ changes in steps, with such changes reflected as spikes in $\dot{X}_{motor}$ (the derivative of a step is an impulse). As will be described in connection with FIG. 6, differentiator 540 may be constructed in a specialized manner that reduces the effects of such spikes. Differentiator 540 thus avoids noise that would otherwise be found in $\dot{X}_{motor}$. Such avoidance of noise enables the overall control stage to operate at much higher gain than would otherwise be feasible, driving down the effects of motor cogging to negligible levels, ideally below the threshold of detectability by a human user.

Differentiator 550 receives as input and error signal, $X_{err}$, which represents a difference between a command position, $X_{cmd}$ (e.g., an integral of command velocity $\dot{X}_{cmd}$) and the angular position of the motor, $X_{motor}$. In response, differentiator 550 produces as output an error velocity, $\dot{X}_{err}$. Differentiators 540 and 550 may have similar construction. Thus, differentiator 550 also avoids excessive noise in a similar manner.

Figure 6:
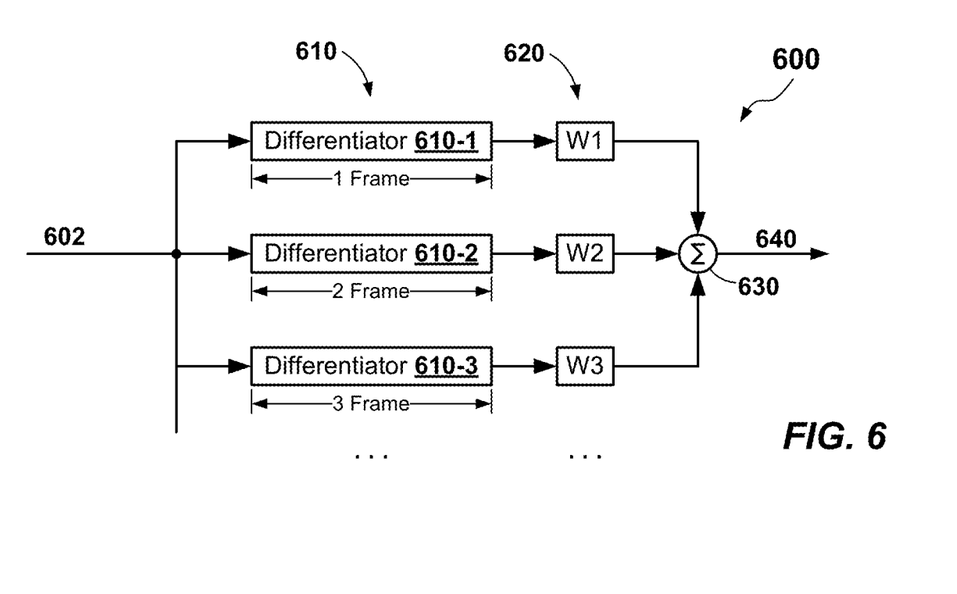
FIG. 6 is a block diagram showing an example differentiator of FIG. 5 in greater detail.

FIG. 6 shows an example construction of a differentiator 600, which is intended to be representative of differentiators 540 and 550 and is optimized to reduce noise induced by the encoder in the encoder position 510. As shown, differentiator 600 includes multiple differentiator elements 610 that all connect to input 602 (e.g., $X_{motor}$ or $X_{err}$) and operate in parallel over respective time intervals. For example, differentiator element 610-1 operates over one frame (one update interval), differentiator element 610-2 operates over two frames, differentiator element 610-3 operates over three frames, and so on, for any desired number of elements (a particular example includes six such elements). Outputs of the differentiator elements are weighted by respective weights 620 (e.g., W1, W2, W3, and so on), and weighted outputs are summed together by summer 630. A resulting output 640 thus represents a weighted sum of the contributions of the differentiator elements 610.

In an example, weights 620 are established in a manner that reduces noise while optimizing performance. For example, elements 610 that produce high-noise outputs may be weighted less than elements 610 that produce lower-noise outputs. The resulting output signal 640 thus has much lower noise than it would if a single differentiator had been used.

Figure 7:
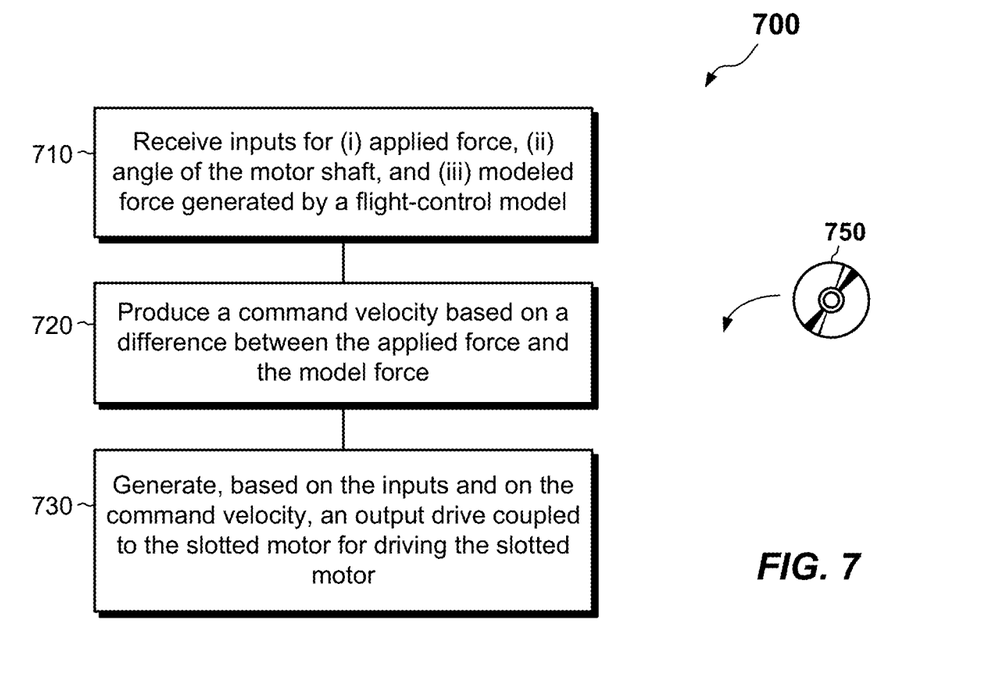
FIG. 7 is a flowchart of an example method for control loading.

FIG. 7 shows an example method 700 that may be carried out in connection with the control loading system of FIGS. 1-6. The method 700 is typically performed, for example, by software-implemented features described in connection with FIGS. 4-6, which reside in memory of the depicted CLC (or CLSD) and are run by the set of processors therein.

At 710, inputs are received for (i) applied force 410, (ii) the angle 510 of the motor shaft 210, and (iii) a modeled force 430 generated by a flight-control model.

At 720, a command velocity $\dot{X}_{cmd}$ is produced based on a difference, e.g., via summer 512, between the model force 430 and the applied force 410.

At 730, an output drive 450 is generated based on the inputs 410, 510, and 430, and on the command velocity $\dot{X}_{cmd}$. The output drive 450 is coupled to the slotted motor 110 for driving the slotted motor 110.

An improved technique has been described for control loading that employs a slotted motor 110 having a higher power density than slotless motors of similar power. The use of smaller slotted motors enables more efficient mounting hardware, smaller gear reduction mechanisms, and more efficiently mounted force transducers. The improved technique overcomes cogging and smooths the torque response by combining high-gain servo control with high-resolution motor sensing. Slotted motors are thus enabled to perform at a level previously achieved only with slotless motors, but with dramatic reductions in size, weight, and cost.

The improved technique addresses the deficiencies of today's high fidelity control loaders, which are large, heavy, and expensive, causing control loading systems to be costly and difficult to install in simulators. The improved design provides small size, light weight, high torque, and high fidelity. It is 14 CFR Part 60, Level D capable and produces exceptionally smooth "feel" using a slotted frameless motor and off-the-shelf servo drive.

The new loader delivers dramatic advantages. Based on observations, advantages include 50% more torque, 56% more velocity, 53% less weight, 63% less footprint, 43% less factory cost, and lower logistic costs compared to previous devices.

Having described certain embodiments, numerous alternative embodiments or variations can be made. For example, although a control loading technique has been shown and described in connection with flight simulators, this is merely an example. Alternatively, the disclosed techniques may be used in connection with space, air, sea and land vehicle simulators; "Iron Birds"; simulation test stands; and/or any other applications where control force or control force feedback "feel" is required.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 750 in FIG. 7). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the disclosure.

What is claimed is:

1. A control loading system, comprising:
a slotted motor having a motor shaft and an encoder configured to measure an angle of the motor shaft;
an output arm coupled to the motor shaft and including a force transducer configured to measure an applied force applied by an operator; and
a control stage configured to:
receive inputs for (i) the applied force, (ii) the angle of the motor shaft, and (iii) a modeled force generated by a flight-control model;
produce a command velocity based on a difference between the model force and the applied force;
generate a measure of command position as an integration of the command velocity;
generate an error between the measure of command position and the angle of the motor shaft;
differentiate the error to produce a differentiated error; and
generate, based on the inputs on the differentiated error, and on the command velocity, an output drive coupled to the slotted motor for driving the slotted motor.

2. The control loading system of claim 1, wherein the control stage is further configured to apply a motor pole map to generate a cogging-correction based at least in part on (i) the angle of the motor shaft and (ii) the command velocity.

3. The control loading system of claim 2, wherein the motor pole map includes an adaptive lookup table.

4. The control loading system of claim 1, wherein the control stage is further configured to differentiate the angle of the slotted motor to generate a measure of angular velocity of the slotted motor, wherein generation of the output drive is further based at least in part on the measure of angular velocity of the slotted motor.

5. The control loading system of claim 4, wherein the control stage includes multiple weighted differentiator elements configured to operate over respective time intervals, and wherein the measure of angular velocity of the slotted motor is based at least in part on a sum of outputs of the weighted differentiator elements.

6. The control loading system of claim 5, wherein weights of the weighted differentiator elements are established to optimize suppression of quantization noise introduced by the encoder.

7. The control loading system of claim 1, wherein the control stage configured to differentiate the error includes multiple weighted differentiator elements configured to operate over respective time intervals, and wherein the differentiated error is based at least in part of a sum of outputs of the weighted differentiator elements.

8. The control loading system of claim 7, wherein weights of the weighted differentiator elements are configured to suppress quantization noise introduced by the encoder.

9. A computer program product including a set of non-transitory, computer-readable media having instructions which, when executed by control circuitry of a computerized apparatus, cause the computerized apparatus to perform a method of control loading, the method comprising:

receiving inputs for (i) an applied force applied by an operator and measured by a force transducer; (ii) an angle of a motor shaft of a slotted motor as measured by an encoder coupled to the slotted motor, and (iii) a modeled force generated by a flight-control model;
producing a command velocity based on a difference between the model force and the applied force;
differentiating the angle of slotted motor to generate a measure of angular velocity of the slotted motor; and
generating, based on the inputs, the measure of angular velocity, and on the command velocity, an output drive coupled to the slotted motor for driving the slotted motor.

10. The computer program product of claim 9, wherein differentiating the angle of the slotted motor includes:
providing multiple weighted differentiator elements that operate over respective time intervals; and
summing outputs of the weighted differentiator elements to provide the measure of angular velocity of the slotted motor.

11. The computer program product of claim 10, wherein weights of the weighted differentiator elements are established to optimize suppression of quantization noise introduced by the encoder.

12. The computer program product of claim 9, wherein generating the output drive is further includes:
generating a measure of command position as an integration of the command velocity;
generating an error between the measure of command position and the angle of the motor shaft; and
differentiating the error to produce a differentiated error, the output drive further being based on the differentiated error.

13. A method of control loading, comprising:
receiving inputs for (i) an applied force applied by an operator and measured by a force transducer; (ii) an angle of a motor shaft of a slotted motor as measured by an encoder coupled to the slotted motor, and (iii) a modeled force generated by a flight-control model;
producing a command velocity based on a difference between the model force and the applied force;
differentiating the angle of slotted motor to generate a measure of angular velocity of the slotted motor; and
generating, based on the inputs, on the measure of angular velocity, and on the command velocity, an output drive coupled to the slotted motor for driving the slotted motor.

14. The method of claim 13, wherein generating the output drive includes applying a motor pole map to generate a cogging-correction based at least in part on (i) the angle of the motor shaft and (ii) the command velocity.

15. The method of claim 14, wherein the motor pole map includes an adaptive lookup table.

16. The method of claim 13, wherein differentiating the angle of the slotted motor includes:
providing multiple weighted differentiator elements that operate over respective time intervals; and
summing outputs of the weighted differentiator elements to provide the measure of angular velocity of the slotted motor.

17. The method of claim 16, further comprising establishing weights of the weighted differentiator elements to optimize suppression of quantization noise introduced by the encoder.

18. The method of claim 13, wherein generating the output drive is further includes:

generating a measure of command position as an integration of the command velocity;

generating an error between the measure of command position and the angle of the motor shaft; and differentiating the error to produce a differentiated error, the output drive further being based on the differentiated error.

19. The control loading system of claim 18, wherein differentiating the error includes:

providing multiple weighted differentiator elements that operate over respective time intervals; and summing outputs of the weighted differentiator elements to provide the differentiated error.

20. The method of claim 19, further comprising establishing weights of the weighted differentiator elements to optimize suppression of quantization noise introduced by the encoder.

* * * * *